United States Patent Office 3,459,636
Patented Aug. 5, 1969

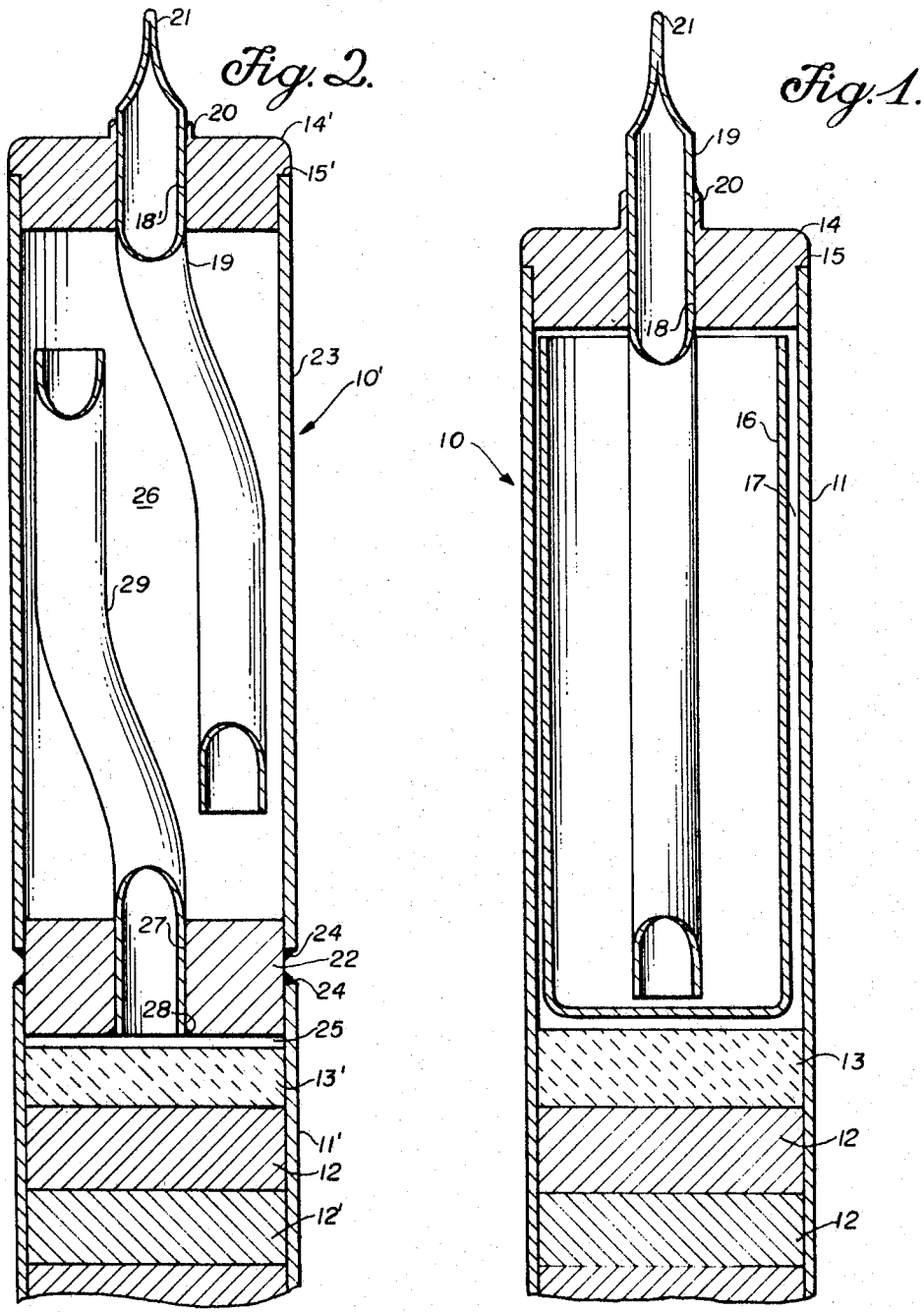

3,459,636
VENTED FUEL PIN
John H. Germer, San Jose, Calif., assignor to the United States of America as represented by the United States Atomic Energy Commission
Filed July 24, 1968, Ser. No. 747,321
Int. Cl. G21c 3/04
U.S. Cl. 176—68     6 Claims

ABSTRACT OF THE DISCLOSURE

A device incorporated in the upper end of a vented type nuclear fuel element which permits outward leakage of fission product gases and prevents inward leakage of coolant. This is accomplished by venting gases to the upper end of the fuel pin which is at a lower external pressure than in the vicinity of the bottom of the plenum. In addition, venting at the top of the plenum eliminates a coolant level variation in the plenum caused by pressure variations. Also, the device includes means for preventing air and moisture from getting into the fuel element and fuel from escaping during initial handling.

BACKGROUND OF THE INVENTION

The invention described herein was made in the course of, or under, Subcontract W-31-109-38-1997 under A.E.C. Contract No. W-31-109-Eng-38 with the United States Atomic Energy Commission.

This invention relates to nuclear reactor fuel elements, and particularly to the so-called vented fuel elements which have protecting sheaths or cladding so adapted that gases released by the fuel content during operation of the reactor are allowed to escape along a vent path to the surrounding coolant.

As commonly known, vented fuel elements have the advantage that, with gas releasing types of fuels, such as fissile oxides operated at high temperatures, the limitation on the irradiation life of the element due to pressure stressing of the sheath is virtually eliminated.

Various prior art approaches have been developed for venting fission gases from the fuel pins into the coolant, particularly in sodium-cooled reactors. U.S. Patents 3,357,-893 to J. A. Gatley et al., and 3,356,585 to E. L. Zebroski exemplify these prior art efforts. In such prior arrangements, the plenum serves as a buffer region between the fuel and the coolant and is designed to be of such a capacity that variations in pressure and temperature will never cause sodium or other coolant to rise to the top of the plenum and spill onto the fuel. In these prior devices, and during normal operation, gas will slowly bubble out of the vent hole into the sodium stream without building upon high pressure within the cladding of the fuel element, the sodium rising part way up the plenum when power is decreased without wetting the fuel. The following examples illustrate problems previously unsolved by the prior art approaches:

(1) The gas is vented to the coolant at the lower end of the plenum, where the ambient pressure varies considerably with sodium flow rate, thus requiring extra plenum length to accommodate the pressure variations.

(2) The use of an intermediate transition piece, complicated by critical welds.

(3) The vent hole is not sealed during initial handling of the fuel element or fuel bundle, thus making it possible to leak plutonium, for example, or to allow air and moisture to get inside of the fuel pin.

SUMMARY OF THE INVENTION

The above-mentioned prior problems have been solved by the present invention, wherein the gases are vented to the upper end of the fuel pin. This region is at a lower pressure than in the vicinity of the bottom of the plenum because of the pressure drop past the plenum region of the fuel pin or element. This pressure drop is in the order of one atmosphere or more, and venting at the top eliminates a sodium level variation in the plenum caused by this pressure variation. In addition, the welds are in a non-critical area and the top vent tube replaces the prior vent in the side of the fuel pin, the upper end of the vent tube being sealed, for example, by a conventional pinch-off cold welding technique to prevent leakage into or out of the fuel pin or element during initial handling thereof.

Therefore, it is an object of this invention to provide a vented fuel pin for nuclear reactors which permits outward leakage of fission product gases and prevents inward leakage of liquid sodium.

A further object of the invention is to provide a device in the upper end of a fuel element which is sealed during initial handling, thus preventing leakage into and out of the element during initial handling thereof.

Another object of the invention is to provide a vented fuel pin for a nuclear reactor wherein the gas vent is in the upper end thereof thus eliminating any coolant level variation in the plenum caused by pressure variations during various operating conditions of the reactor.

Other objects of the invention will become readily apparent from the following description and accompanying drawings, wherein:

BRIEF DESCRIPTION OF THE DRAWINGS

FIGURE 1 is a cross sectional view of a portion of a vented fuel pin incorporating a preferred embodiment of the invention; and FIGURE 2 is a cross sectional view of a portion of a prior art type vented fuel element modified in accordance with the present invention.

DESCRIPTION OF THE EMBODIMENTS

The preferred embodiment of the invention, as shown in FIGURE 1, comprises a fuel pin or element generally indicated at 10 composed of a cladding or containment tube 11 containing in the lower end thereof a fuel pellet 12 and a ceramic pellet 13, the details of which are conventionally known in the art and do not constitute part of the present invention. The upper end of containment or cladding tube 11 is closed by an end plug or cap 14 which is welded at 15 or otherwise secured in sealed relation to tube 11, thereby defining a gas plenum therein. Positioned in said plenum intermediate ceramic pellet 13 and end plug or cap 14 is a thin walled plenum cup 16 configured to define a leakage annulus 17 between cup 16 and cladding tube 11, and between cup 16 and each of ceramic pellet 13 and end plug 14. End plug or cap 14 is provided with an aperture 18 through which a vent tube 19 extends into plenum cup 16, vent tube 19 being secured to end cap 14 by weld 20 or other suitable sealing means and terminating at the lower end thereof in a spaced relationship with the bottom of plenum cup 16. While not shown, plenum cup 16 may be secured between end plug 14 and ceramic pellet 13 by a spider type means connected to vent tube 19 or by other conventional means to maintain the spaced relationship as shown. The upper or outer end of vent tube 19 is initially sealed, such as by a pinch-off weld 21, made by a conventional cold welding technique, for example. The vent tube 19 may be, for example, constructed of nickel in that a nickel tube is: (1) adaptable to cold welding, and (2) very weak at normal reactor outlet temperature (about 1100° F.), and at that temperature it will easily rupture under a relatively low internal pressure, thus forming the required vent. Other materials having the desired properties may be utilized in the vent tube 19.

As an alternative to constructing the vent tube 19 of nickel, the use of soft solder in the pinch-off area 21 is feasible. The solder will melt when the fuel pin or element 10 is inserted into the reactor core and cause leakage without first having to build up gas pressure. Spring-back in the pinch-off portion of the tube will cause the vent to be formed as soon as the melting point of the solder is reached. The required amount of soft solder is very small, and has an insignificant effect on the purity of the sodium coolant. This can be accomplished by plating at least the inside surface of the outer end of the vent tube with soft solder, and then forming the seal either by a cold weld, or by heating and cooling the pinched-off section while it is held by a pinching tool. The tube itself could be of the same stainless steel as in the rest of the fuel pin when the pinch-off utilizes soft solder.

Referring now to FIG. 2, wherein is illustrated a conventional "diving bell" type vent, modified to provide the novel top vent and seal arrangement of the present invention. As shown in FIGURE 1, a fuel pin or element 10' is composed of a containment or cladding tube 11' containing a fuel pellet 12' and ceramic pellet 13' as known in the art. An intermediate transition member 22 interconnects cladding or containment tube 11' with an additional section of cladding or containment tube 23, tubes 11' and 23 being welded at 24, or otherwise sealed to member 22, with member 22 and pellet 13' defining a space or plenum 25 therebetween. The upper end of cladding tube section 23 is closed by an end plug 14' which is welded at 15' or otherwise sealed to tube section 23. End plug or cap 14' is provided with an aperture 18' through which a vent tube 19' extends into a plenum 26 defined by cladding tube section 23, transition member 22 and end plug 14'. Vent tube 19' is secured to end plug or cap 14' by a weld 20' or other suitable sealing means, the lower end of tube 19' terminating in a spaced relationship with intermediate transition member 22. The upper or outer end of vent tube 19' is initially sealed, such as by a pinch-off weld 21' as described above with respect to the FIG. 1 embodiment. Transition member 22 is provided with an aperture 27 which provides fluid communication between space 25 and plenum 26. Secured in aperture 27, such as by welding at 28, is a tube 29 which terminates in spaced relation with end plug 14'. Thus, gases generated by the fuel element or pin 10' collect in space 25 and pass through tube 29 into plenum 26 for venting through vent tube 19' in a manner similar to which gases generated by fuel element 10 in FIG. 1 pass through annulus 17 into plenum cup 16 for venting via vent tube 19.

If desired, the FIGS. 1 and 2 embodiments may be modified by removing the pinch-off element which overcomes at least a portion of the prior art problems without the advantageous sealing concept for initial handling of the fuel elements.

It is thus seen that the present invention, while simple in construction, greatly advances the state of the art of venting nuclear fuel pins or elements by overcoming known disadvantages of the prior art venting devices.

While particular embodiments of the invention have been illustrated and described, modifications will become apparent to those skilled in the art, and it is intended to cover in the appended claims all such modifications as come within the spirit and scope of the invention.

I claim:
1. In a nuclear reactor fuel element, a device for venting gases therefrom and preventing contamination thereof, comprising: a containment tube means, said containment tube means being adapted to contain nuclear fuel in one end portion thereof and being closed by an end cap means at the opposite end thereof to define a gas plenum means intermediate said end cap means and associated nuclear fuel, means positioned in said plenum means adapted for directing gas generated by associated nuclear fuel in said one end portion of said containment tube means from an area of said gas plenum means adjacent such associated nuclear fuel to an area of said gas plenum means adjacent said end cap means, and vent tube means extending through and secured in an aperture in said end cap means and terminating at one end thereof in a spaced relationship with respect to the end of said gas plenum means opposite said end cap means, said vent tube means being provided with seal means whereby said seal means initially prevents contaminants from entering said gas plenum means and allows the venting of gas from said gas plenum means during normal operation of an associated nuclear fuel adapted to be contained in said containment tube means.

2. The device defined in claim 1, wherein said gas directing means comprises a cup-like member positioned in said gas plenum means, said cup-like member defining a leakage annulus between the wall surface thereof and said containment tube means, and being located in a spaced relation with respect to said end cap means and associated nuclear fuel adapted to be contained in said one end portion of said containment tube means.

3. The device defined in claim 1, wherein said gas directing means comprises a transition member secured to said containment tube means in a spaced relationship with respect to associated nuclear fuel adapted to be contained in said one end portion of said containment tube means, and tube means extending through and secured to said transition means for providing fluid communication between a portion of said gas plenum means located intermediate said transition member and such associated nuclear fuel and the said area of said gas plenum means adjacent said end cap means.

4. The device defined in claim 1, wherein said seal means for said vent tube means is positioned in said vent tube means externally of said gas plenum means.

5. The device defined in claim 1, wherein at least a portion of said vent tube means is constructed of nickel, said seal means being located in said nickel portion and comprising a pinch-off weld.

6. The device defined in claim 1, wherein at least a portion of said vent tube means is provided with a soft solder on at least the internal surface thereof, said seal means being located in said soft solder containing portion and comprising a pinch-off section thereof.

References Cited

UNITED STATES PATENTS

| | | | |
|---|---|---|---|
| 3,231,476 | 1/1966 | Thorne | 176—37 X |
| 3,274,070 | 9/1966 | Vanslager | 176—37 X |
| 3,356,585 | 12/1967 | Zebroski | 176—68 |
| 3,357,893 | 12/1967 | Gatley et al. | 176—68 |
| 3,399,112 | 8/1968 | Dodd | 176—37 X |
| 3,406,094 | 10/1968 | Beisswenger et al. | 176—37 X |

BENJAMIN R. PADGETT, Primary Examiner

MELVIN J. SCOLNICK, Assistant Examiner

U.S. Cl. X.R.

176—37, 79